US011376784B2

(12) United States Patent
Hakkaku

(10) Patent No.: US 11,376,784 B2
(45) Date of Patent: Jul. 5, 2022

(54) THREE-DIMENSIONAL OBJECT SHAPING SYSTEM

(71) Applicant: MIMAKI ENGINEERING CO., LTD., Nagano (JP)

(72) Inventor: Kunio Hakkaku, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 94 days.

(21) Appl. No.: 16/777,898

(22) Filed: Jan. 31, 2020

(65) Prior Publication Data

US 2020/0164569 A1 May 28, 2020

Related U.S. Application Data

(63) Continuation of application No. 15/294,790, filed on Oct. 17, 2016, now abandoned.

(30) Foreign Application Priority Data

Oct. 19, 2015 (JP) .................. 2015-205812

(51) Int. Cl.
*B29C 64/209* (2017.01)
*B29C 64/112* (2017.01)
*B29C 64/40* (2017.01)
*B29C 64/364* (2017.01)
*B33Y 10/00* (2015.01)
*B33Y 30/00* (2015.01)
*B29K 105/00* (2006.01)

(52) U.S. Cl.
CPC .......... *B29C 64/112* (2017.08); *B29C 64/209* (2017.08); *B29C 64/364* (2017.08); *B29C 64/40* (2017.08); *B33Y 10/00* (2014.12); *B33Y 30/00* (2014.12); *B29K 2105/0058* (2013.01)

(58) Field of Classification Search
CPC ..... B29C 64/20; B29C 64/205; B29C 64/209; B29C 64/227; B29C 64/232; B29C 64/236; B29C 64/30; B29C 64/364; B29C 64/106; B29C 64/112; B29C 64/118; B29C 64/124; B33Y 10/00; B33Y 30/00; B33Y 99/00
See application file for complete search history.

(56) References Cited

U.S. PATENT DOCUMENTS

2012/0262526 A1* 10/2012 Ohnishi ................. D06B 1/142
347/105
2013/0186558 A1* 7/2013 Comb .................... B29C 64/147
156/277

(Continued)

*Primary Examiner* — Joseph S Del Sole
*Assistant Examiner* — Jamel M Nelson
(74) *Attorney, Agent, or Firm* — JCIPRNET

(57) ABSTRACT

The present disclosure makes it possible to appropriately shape a three-dimensional object with high precision. A three-dimensional object shaping system of the present disclosure for shaping a three-dimensional object includes: inkjet heads that discharge ink droplets using an ink jet method; a shaping platform that is a platform-shaped member on which the three-dimensional object being shaped is supported at a position facing the inkjet heads; a main scanning driver that causes the inkjet heads to perform a main scanning operation in which ink droplets are discharged while moving relative to the shaping platform in a pre-set main scanning direction; and an airflow generator that generates airflows that flow from the inkjet heads toward the shaping platform.

16 Claims, 3 Drawing Sheets

(56) References Cited

U.S. PATENT DOCUMENTS

2015/0266305 A1* 9/2015 Gasso Puchal ...... B41J 2/17563
96/400
2016/0279706 A1* 9/2016 Domrose ............... B33Y 10/00
2017/0129180 A1* 5/2017 Coates ................... B22F 12/00

* cited by examiner

THREE-DIMENSIONAL OBJECT SHAPING SYSTEM

CROSS REFERENCE TO RELATED APPLICATIONS

This application is a continuation of and claims the priority benefit of U.S. patent application Ser. No. 15/294,790, filed on Oct. 17, 2016, and claims the priority benefit of Japanese Patent Application No. 2015-205812, filed on Oct. 19, 2015. The entireties of the above-mentioned patent applications are hereby incorporated by reference herein and made a part of this specification.

TECHNICAL FIELD

The present disclosure relates to a shaping apparatus, a shaping method and a three-dimensional object shaping system.

BACKGROUND ART

Conventionally, inkjet printers that perform printing using an ink jet method are widely known (e.g., see http://www.mimaki.co.jp). Also, in recent years, a method of shaping three-dimensional objects using inkjet heads (i.e., an inkjet shaping method) has been under consideration for application in shaping apparatuses for shaping three-dimensional objects (3D printers). In such shaping, a three-dimensional object is shaped using a laminate shaping method (additive manufacturing) in which layers of ink formed by inkjet heads are stacked on one another, for example.

Examples of related art can be found at http://www.mimaki.co.jp.

When shaping objects using the inkjet shaping method, it is conceivable to use a shaping apparatus obtained by partially modifying an inkjet printer for printing two-dimensional images, for example. However, when shaping a three-dimensional object, problems may occur that do not arise when printing two-dimensional images. For this reason, there is desire for a shaping apparatus that shapes three-dimensional objects to have a configuration that takes into account problems specific to the shaping of three-dimensional objects. In view of this, an object of the present disclosure is to provide a shaping apparatus and a shaping method that can solve the issues described above.

The inventors of the present disclosure conducted thorough research on problems specific to the shaping of three-dimensional objects and the like. It was discovered that when an inkjet head discharges ink droplets onto the shaping surface of a three-dimensional object being shaped on a shaping platform or the like, a phenomenon different from the case of printing two-dimensional images occurs. More specifically, when printing a two-dimensional image for example, ink droplets are usually discharged onto a flat medium. Also, the distance between the inkjet head and the medium is constant in such a case. As a result, the influence of air resistance, which is encountered by discharged ink droplets during their flight from the inkjet head, is usually constant regardless of the position on the medium.

In contrast, when shaping a three-dimensional object, the edges (e.g., outer peripheral portions) and the like of the three-dimensional object rise perpendicularly to the shaping platform. In this case, when the inkjet head is moved relative to the three-dimensional object during a main scanning operation (scan operation) or the like, the spatial shape of the region that opposes the inkjet head changes rapidly at the edges of the three-dimensional object. This results in an airflow disturbance such as a tumble flow, which is a vertical vortex, in the vicinity of the edge of the three-dimensional object, and this influences the flight of ink droplets. In particular, at the front edge in the main scanning direction, the inkjet head is at a position separated from the three-dimensional object, and therefore an airflow flowing in a direction that hinders the flight of ink droplets (upward direction) is generated. As a result, there is a risk of an increase in shifting of the ink droplets landing position. There is also a risk of ink droplets forming a mist or the like instead of landing on the shaping surface appropriately.

To address this, through further research, the inventors of the present disclosure thought that instead of simply discharging ink droplets from an inkjet head, it is possible to generate an airflow that flows from the inkjet head toward the shaping platform around (surrounding) flying ink droplets, for example. According to such a configuration, it is possible to cause ink droplets to more appropriately land on the shaping surface, even in the vicinity of edges where an upward airflow is generated due to a tumble flow, for example. Accordingly, it is possible to appropriately solve problems specific to the shaping of three-dimensional objects, and appropriately shape a three-dimensional object with high precision. Specifically, in order to solve the issues described above, the present disclosure includes the configurations described below.

SUMMARY

Configuration 1

A shaping apparatus according to an aspect of the present disclosure is a shaping apparatus for shaping a three-dimensional object, the shaping apparatus including: an inkjet head configured to discharge ink droplets using an ink jet method; a shaping platform that is a platform-shaped member configured to support the three-dimensional object being shaped at a position facing the inkjet head; a main scanning driver configured to cause the inkjet head to perform a main scanning operation in which ink droplets are discharged while moving relative to the shaping platform in a pre-set main scanning direction; and an airflow generator configured to generate an airflow that flows from the inkjet head toward the shaping platform.

According to this configuration, even if a tumble flow or the like is generated in the vicinity of an edge of the three-dimensional object due to the main scanning operation for example, it is possible to cause ink droplets to appropriately land on the three-dimensional object being shaped. Accordingly, it is possible to appropriately shape a three-dimensional object with high precision, for example.

Note that in this configuration, the airflow flowing from the inkjet head toward the shaping platform may be an airflow that flows from the vicinity of the inkjet head toward the shaping platform, for example. Also, the inkjet head discharges ink droplets in the vertically downward direction, for example. In this case, the airflow that flows from the inkjet head toward the shaping platform may be an airflow that flows in the vertically downward direction, for example.

Configuration 2

A three-dimensional object whose height is at least 1 cm may be shaped. In this case, the height of the three-dimensional object is the height in the case where the height direction is the direction parallel to the discharge direction in which the inkjet head discharges ink droplets, for example. More specifically, the height of the three-dimensional object may be the height in the vertical direction. Also, the height of the three-dimensional object may be at least 3 cm, for example.

If the height of the three-dimensional object is high, a tumble flow or the like is particularly likely to be generated in the vicinity of an edge of the three-dimensional object during the main scanning operation. To address this, according to the above configuration, it is possible to cause ink droplets to appropriately land on the three-dimensional object being shaped even if a tumble flow or the like is generated, for example.

Configuration 3

When the three-dimensional object being shaped and the inkjet head face each other during the main scanning operation, the distance between an uppermost surface of the three-dimensional object being shaped and the inkjet head may be adjusted to a distance according to which a front edge airflow is generated at an edge of the three-dimensional object on a front side in a direction of movement of the inkjet head during the main scanning operation, the front edge airflow being an airflow flowing from the three-dimensional object toward the inkjet head, and the airflow generator may generate an airflow that flows from the inkjet head toward the shaping platform against the front edge airflow.

In order to shape a three-dimensional object with high precision, the distance (gap) between the uppermost surface of the three-dimensional object being shaped and the inkjet head needs to be set sufficiently small. However, it is thought that setting a small gap makes it more likely for an airflow disturbance such as a tumble flow to be generated at the edge of the three-dimensional object. In particular, a front edge airflow such as that described above is generated at the edge of the three-dimensional object on the front side in the direction of movement of the inkjet head during the main scanning operation, and thus the flight of ink droplets is hindered.

To address this, according to the above configuration, an airflow that flows against the front edge airflow is generated by the airflow generator, thus making it possible to appropriately suppress the influence of the front edge airflow, for example. Accordingly, it is possible to cause ink droplets to more appropriately land on the three-dimensional object being shaped, for example.

Note that the uppermost surface of the three-dimensional object being shaped is the surface of the three-dimensional object on the side closest to the inkjet head, for example. Also, in this configuration, an airflow that flows from the inkjet head toward the shaping platform against the front edge airflow refers to an airflow that overcomes the influence of the front edge airflow and causes ink droplets to land on the three-dimensional object, for example. Also, overcoming the influence of the front edge airflow and causing ink droplets to land on the three-dimensional object refers to causing ink droplets to land with a precision in an allowable range that corresponds to the shaping resolution, for example.

Configuration 4

When ink droplets are discharged from the inkjet head toward a flat region, the inkjet head may discharge ink droplets under a condition according to which the ink droplets land with a precision in an allowable range corresponding to a resolution of the three-dimensional object even without causing an airflow to be generated by the airflow generator.

For example, when discharging ink droplets using a configuration that is the same as or similar to an known inkjet printer for printing two-dimensional images, ink droplets can usually be caused to appropriately land on a flat region that is similar to a flat medium even without using the airflow generator or the like. In this case, the flat region is a region in which it is possible to ignore the influence of a tumble flow or the like that is generated in the vicinity of an edge of the three-dimensional object, for example. Also, being able to cause ink droplets to land appropriately refers to the speed of ink droplets traveling toward the target landing position being greater than zero immediately before landing, for example. More specifically, in the case where the inkjet head discharges ink droplets in the vertically downward direction, the speed of ink droplets traveling toward the target landing position being greater than zero need only refer to the vertically downward speed component of the speed of the ink droplets being greater than zero immediately before landing.

However, in this case as well, if ink droplets are simply discharged from the inkjet head in the vicinity of the edge of the three-dimensional object, there are cases where it is difficult to cause ink droplets to appropriately land at the landing position due to the influence of a tumble flow or the like that is generated due to relative movement of the inkjet head during the main scanning operation. To address this, according to the above configuration, an airflow is generated by the airflow generator, thus making it possible to cause ink droplets to land at a more appropriate landing position even in the vicinity of an edge of the three-dimensional object.

Configuration 5

The distance between an uppermost surface of the three-dimensional object being shaped and the inkjet head may be less than or equal to 3 mm. It is preferable that this distance is less than or equal to 1 mm, for example.

If the distance (gap) between the uppermost surface of the three-dimensional object being shaped and the inkjet head is sufficiently small, ink droplets can usually be caused to land with higher precision. More specifically, if the gap is less than or equal to 3 mm for example, and the influence of a tumble flow generated in the vicinity of an edge of the three-dimensional object is ignored, ink droplets can be caused to land appropriately and with high precision even without using the airflow generator.

However, when modeling a three-dimensional object, there are cases where it is not possible to ignore the influence of a tumble flow or the like generated in the vicinity of an edge of the three-dimensional object, as described above. As a result, if ink droplets are simply discharged in the vicinity of an edge of the three-dimensional object, there are cases where it is difficult to cause ink droplets to land appropriately. To address this, according to the above configuration, it is possible to cause ink droplets to land more appropriately even in the vicinity of an edge of the three-dimensional object.

Configuration 6

The inkjet head may discharge ink droplets having a volume of at least 1 pL (picoliter). The ink droplets may have a volume of at least 3 pL, for example.

If the ink droplets volume is sufficiently high, it is usually possible to cause the ink droplets to land with higher precision. More specifically, if the ink droplets volume is at least 1 pL for example, and the influence of a tumble flow generated in the vicinity of an edge of the three-dimensional object is ignored, ink droplets can be caused to land appropriately and with high precision even without using the airflow generator.

However, when modeling a three-dimensional object, there are cases where it is not possible to ignore the influence of a tumble flow or the like generated in the vicinity of an edge of the three-dimensional object, as described above. As a result, if ink droplets are simply discharged in the vicinity of an edge of the three-dimensional object, there are cases where it is difficult to cause ink droplets to land appropriately. To address this, according to the above configuration, it is possible to cause ink droplets to land more appropriately even in the vicinity of an edge of the three-dimensional object.

Configuration 7

A shaping method according to an aspect of the present disclosure is a shaping method for shaping a three-dimensional object, including: using an inkjet head that discharges ink droplets using an ink jet method; supporting the three-dimensional object being shaped at a position facing the inkjet head on a shaping platform that is a platform-shaped member; generating an airflow that flows from the inkjet head toward the shaping platform; and causing the inkjet head to perform a main scanning operation in which ink droplets are discharged while moving relative to the shaping platform in a pre-set main scanning direction. According to this configuration, effects similar to those of Configuration 1 can be obtained, for example.

Configuration 8

A three-dimensional object shaping system that is a shaping apparatus for shaping a three-dimensional object, comprising: a controller that controls an operation for shaping the three-dimensional object by controlling each unit of the shaping apparatus based on a geometric information and a color image information of the three-dimensional object that is to be shaped; a plurality of inkjet heads, configured to discharge ink droplets using an inkjet method; a shaping platform that is a platform-shaped member configured to support the three-dimensional object being shaped at a position facing the inkjet heads; a carriage that holds the plurality of inkjet heads facing the shaping platform; a main scanning driver, configured to cause the inkjet heads to perform a main scanning operation in which ink droplets are discharged while moving relative to the shaping platform in a pre-set main scanning direction; and a laminate direction driver, configured to move the inkjet heads or the shaping platform in a laminate direction orthogonal to the main scanning direction and a nozzle surface of each of the inkjet head. The three-dimensional object is shaped by stacking a plurality of ink layers formed by discharging the ink droplets onto the shaping platform. The carriage comprises an air flow generator which generates an airflow that flows from the plurality of inkjet heads toward the shaping platform.

According to one embodiment of the disclosure, a height from the shaping platform to an uppermost surface of the three-dimensional object is 1 cm or more.

According to one embodiment of the disclosure, the plurality of inkjet heads is separated from each other by a predetermined distance.

According to one embodiment of the disclosure, the plurality of inkjet heads is configured to generate an airflow from a plurality of air outlets toward the shaping platform, and in the carriage, the plurality of air outlets is respectively provided on a front side in the main scanning direction of the plurality of inkjet heads.

According to one embodiment of the disclosure, a distance between an uppermost surface of the three-dimensional object during shaping and the inkjet heads is shorter than a distance between the inkjet heads and the shaping platform.

According to one embodiment of the disclosure, the inkjet heads are configured to discharge a model material for forming a main portion of the three-dimensional object and a support material for forming a support portion that supports the main portion by surrounding the main portion of the three-dimensional object, so as to form the ink layers; and the support portion is removed after shaping of the three-dimensional object is completed.

According to one embodiment of the disclosure, the air flow generator is configured to selectively switch a flow of the airflow in accordance with an edge of the three-dimensional object.

According to the present disclosure, it is possible to appropriately shape a three-dimensional object with high precision, for example.

EMBODIMENTS

Figure 1A:
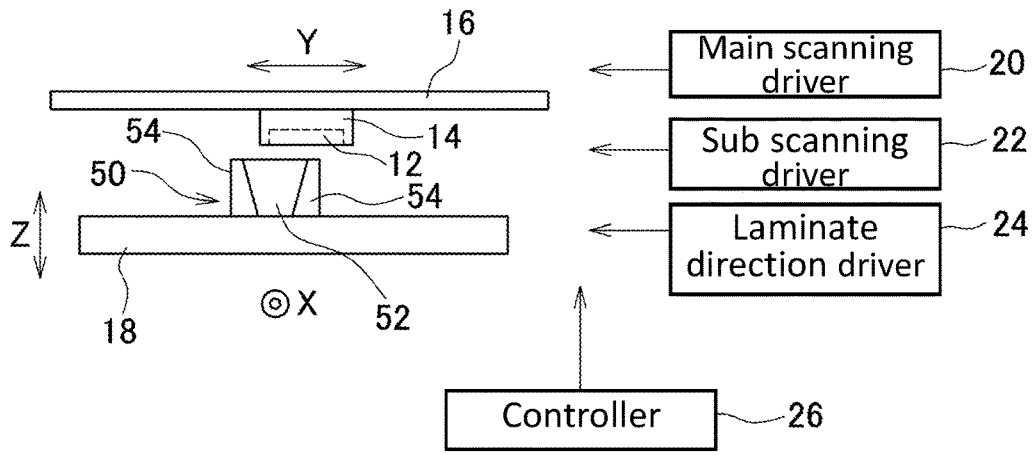
FIG. 1(a) shows an example of a configuration of relevant portions of a shaping apparatus 10 according to an embodiment of the present disclosure.
Figure 1B:
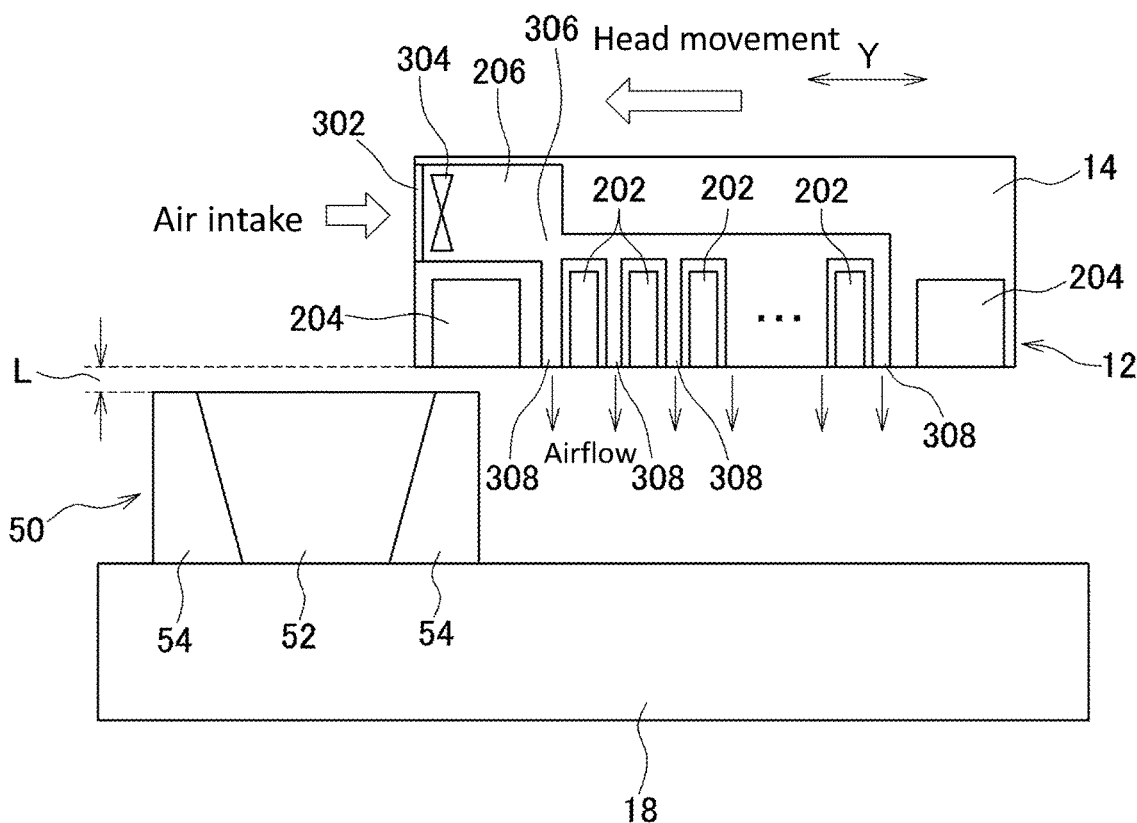
FIG. 1(b) shows an example of a more detailed configuration of a head unit 12 and a carriage 14, along with a three-dimensional object 50 and a shaping platform 18 in the shaping apparatus 10 according to the embodiment.

Hereinafter, an embodiment of the present disclosure will be described with reference to the drawings. FIGS. 1(a) and 1(b) show an example of a shaping apparatus 10 according to this embodiment of the present disclosure. The configuration of relevant portions of the shaping apparatus 10 is shown in FIG. 1(a).

In the present embodiment, the shaping apparatus 10 is an apparatus for shaping a three-dimensional object 50 by a laminate shaping method using inkjet heads (i.e., a three-dimensional object shaping apparatus, which may also be referred to as a "3D printer"). In this case, shaping objects using inkjet heads refers to shaping (forming) objects using an ink jet shaping method. Also the laminate shaping method is a method of shaping the three-dimensional object 50 by stacking layers on one another. The three-dimensional object 50 is an object that has a three-dimensional structure, for example.

Note that with the exception of the points described below, the shaping apparatus 10 may have a configuration that is the same as or similar to a known shaping apparatus. Also, the shaping apparatus 10 may be an apparatus obtained by partially modifying the configuration of a known inkjet printer, for example. For example, the shaping apparatus 10 may be an apparatus obtained by partially modifying an inkjet printer for printing two-dimensional images using ultraviolet curing ink (UV ink). Also, besides the configuration shown in the figures, the shaping apparatus 10 may further include various configurations necessary for the three-dimensional object 50 to be shaped, colored, and the like.

In the present embodiment, the shaping apparatus 10 includes a head unit 12, a carriage 14, a guide rail 16, a shaping platform 18, a main scanning driver 20, a sub scanning driver 22, a laminate direction driver 24, and a controller 26. The head unit 12 is a portion for discharging droplets of a liquid serving as the material of the three-dimensional object 50 (ink droplets), and has at least two or more inkjet heads. The head unit 12 discharges droplets of ink, which cures (hardens) under predetermined conditions, from the inkjet heads, and a stack of layers that constitute the three-dimensional object 50 is formed by allowing the ink to cure.

In the present embodiment, ultraviolet curing ink that cures when irradiated with ultraviolet light, for example, is used as the ink. In this case, the ink is the liquid that is discharged from the inkjet heads, for example. Also, the inkjet heads are discharging heads for discharging droplets of liquid using an ink jet method, for example.

In the present embodiment, the three-dimensional object 50 formed by the head unit 12 has a model portion 52 and a support portion 54, for example. Here, the model portion 52 is the main portion of the three-dimensional object 50 that ultimately remains in the three-dimensional object 50. The support portion 54 is a laminate structure that supports the model portion 52 by surrounding it during shaping, and is eliminated by, for example, being dissolved with water after shaping is complete. A more specific configuration of the head unit 12 will be described in further detail later.

The carriage 14 is a holding portion that holds the head unit 12 so as to face the shaping platform 18. Here, holding the head unit 12 so as to face the shaping platform 18 refers to holding the head unit 12 such that the ink droplets discharge direction is a direction toward the shaping platform 18, for example. Also, in the present embodiment, the carriage 14 has an airflow generator for generating airflows that flow from the inkjet heads in the head unit 12 toward the shaping platform 18. A more specific configuration of the carriage 14 will be described in further detail later.

The guide rail 16 is a rail-shaped member for guiding the movement of the carriage 14. In the present embodiment, the guide rail 16 extends in a pre-set main scanning direction (the Y direction in FIGS. 1(a) and 1(b)) and guides the movement of the carriage 14 in the main scanning direction.

The main scanning driver 20 is a driver that causes the head unit 12 to perform a main scanning operation (Y scanning). Here, causing the head unit 12 to perform a main scanning operation refers to causing the inkjet heads of the head unit 12 to perform a main scanning operation, for example. Also, the main scanning operation is an operation in which the head unit 12 discharges ink droplets while moving in the main scanning direction, for example. In the present embodiment, the main scanning driver 20 causes the head unit 12 to perform the main scanning operation by moving the carriage 14 along the guide rail 16 while causing the inkjet heads of the head unit 12 to discharge ink droplets.

Note that movement of the head unit 12 in the main scanning operation may be movement relative to the shaping platform 18. For this reason, in a modified example of the configuration of the shaping apparatus 10, it is possible to fix the position of the head unit 12 and move the shaping platform 18, for example.

The shaping platform 18 is a platform-shaped member for supporting the three-dimensional object 50 that is being shaped, and is arranged at a position facing the head unit 12. The three-dimensional object 50 is placed on the upper surface of the shaping platform 18 during shaping. Accordingly, the shaping platform 18 holds the three-dimensional object 50 being shaped at a position facing the inkjet heads in the head unit 12.

In the present embodiment, the shaping platform 18 has a configuration in which at least its upper surface can move in the laminate direction (the Z direction in FIGS. 1(a) and 1(b)), and the upper surface is moved in accordance with progress in the shaping of the three-dimensional object 50 by being driven by the laminate direction driver 24. Accordingly, the head-to-platform distance, which is the distance between the inkjet heads of the head unit 12 and the shaping platform 18, is appropriately changed so as to adjust the distance (gap) between the inkjet heads of the head unit 12 and the uppermost surface of the three-dimensional object 50, which is the shaping surface of the three-dimensional object 50 that is being shaping.

Note that in the present embodiment, the laminate direction (layering direction) is the direction in which layers are laminated (layered) on one another in laminate shaping. More specifically, the laminate direction is the direction that is orthogonal to the main scanning direction and the sub scanning direction. Also, the distance between the uppermost surface of the three-dimensional object 50 and the inkjet heads is more specifically the distance between the upper surface of the three-dimensional object 50 and the nozzle surfaces of the inkjet heads provided with the nozzles, for example. The uppermost surface of the three-dimensional object 50 is the surface of the three-dimensional object 50 that is the closest to the inkjet heads. Also, the uppermost surface of the three-dimensional object 50 is the surface on which the next layer of ink is to be formed by the head unit 12 during shaping.

The sub scanning driver 22 is a driver that causes the head unit 12 to perform a sub scanning operation (X scanning). Here, causing the head unit 12 to perform a sub scanning operation refers to causing the inkjet heads of the head unit 12 to perform a sub scanning operation, for example. Also, the sub scanning operation is an operation in which the head unit 12 moves relative to the shaping platform 18 in the sub scanning direction (X direction in FIGS. 1(a) and 1(b)), which is orthogonal to the main scanning direction, for example. The sub scanning operation may be an operation in which the head unit 12 moves relative to the shaping platform 18 in the sub scanning direction by a pre-set feed amount. Also, in the present embodiment, the sub scanning driver 22 causes the inkjet heads of the head unit 12 to perform the sub scanning operation between instances of the main scanning operation.

More specifically, the sub scanning driver 22 causes the inkjet heads to perform the sub scanning operation by, for example, fixing the position of the head unit 12 in the sub scanning direction and moving the shaping platform 18. The sub scanning driver 22 may also cause the inkjet heads to perform the sub scanning operation by fixing the position of the shaping platform 18 in the sub scanning direction and moving the head unit 12.

The laminate direction driver 24 is a driver for moving at least either the head unit 12 or the shaping platform 18 in the laminate direction (Z direction). In this case, moving the head unit 12 in the laminate direction refers to moving the inkjet heads of the head unit 12 in the laminate direction, for example. Moving the shaping platform 18 in the laminate direction refers to moving the position of at least the upper surface of the shaping platform 18, for example. By moving at least either the head unit 12 or the shaping platform 18 in the laminate direction, the laminate direction driver 24 scans the inkjet head in the Z direction (Z scanning) and changes the head-to-platform distance.

More specifically, in the configuration shown in the figures, the laminate direction driver 24 fixes the position of the head unit 12 in the laminate direction and moves the shaping platform 18, for example. The laminate direction driver 24 may also fix the position of the shaping platform 18 in the laminate direction and move the head unit 12.

The controller 26 is a CPU of the shaping apparatus 10, for example, and controls operations for shaping the three-dimensional object 50 by controlling various units of the shaping apparatus 10. It is preferable that the controller 26 controls the units of the shaping apparatus 10 based on geometric information regarding the three-dimensional object 50 that is to be shaped, color image information, and the like. According to the present embodiment, it is possible to appropriately shape the three-dimensional object 50.

Next, a more specific configuration of the head unit 12 and the carriage 14 will be described. FIG. 1(b) shows an example of a more detailed configuration of the head unit 12 and the carriage 14, along with the three-dimensional object 50 and the shaping platform 18. First, an example of the configuration of the head unit 12 will be described.

In the present embodiment, the head unit 12 has multiple inkjet heads 202 and multiple ultraviolet light sources 204. The inkjet heads 202 respectively discharge droplets of ink of different colors or for different purposes. More specifically, the inkjet heads 202 discharge ink for shaping the model portion 52, ink for coloring, ink for forming the support portion 54, and the like. Droplets of ink of different colors are discharged as the droplets of ink for coloring.

A known inkjet head can be suitably used as each of the inkjet heads 202, for example. Each of the inkjet heads 202 has a nozzle row in which nozzles are lined up in the sub scanning direction, and discharges droplets of ultraviolet curing ink. In this case, it is preferable that the ink for forming the support portion 54 is a material whose ultraviolet curing hardness is lower than that of the ink used for forming the model portion 52, and that is also more easily dissolved, for example.

In the present embodiment, the inkjet heads 202 are arranged so as to be side-by-side in the main scanning direction at positions that are lined up in the sub scanning direction. Here, the inkjet heads 202 are side-by-side in the main scanning direction with gaps therebetween for blowing air, as shown in the figures, for example.

The ultraviolet light sources 204 are curing means for curing ink, and emit ultraviolet light for curing the ultraviolet curing ink. UVLEDs (ultraviolet LEDS) or the like can be suitably used as the ultraviolet light sources 204. It is also conceivable to use a metal halide lamp, a mercury lamp, or the like as the ultraviolet light sources 204. In the present embodiment, the ultraviolet light sources 204 are respectively arranged on one side and the other side of the head unit 12 in the main scanning direction so as to sandwich the inkjet heads 202 therebetween.

Note that the specific configuration and the like of the head unit 12 are not limited to the above description, and may be modified in various ways. For example, in the case of the arrangement of the inkjet heads 202, some of the inkjet heads 202 may be arranged so as to be shifted in the sub scanning direction relative to the other inkjet heads 202. Also, the head unit 12 may further have a flattening roller for flattening ink layers, or the like. In this case, a known flattening roller can be suitably used as the flattening roller.

Next, an example of the configuration of the carriage 14 will be described. As described above, in the present embodiment, the carriage 14 has the airflow generator 206 that generates airflows that flow from the inkjet heads 202 of the head unit 12 toward the shaping platform 18. Here, the airflows that flow from the inkjet heads 202 toward the shaping platform 18 may be airflows that flow from the vicinity of the inkjet heads 202 toward the shaping platform 18, as in the configuration illustrated in the figures for example. Also, the airflows that flow toward the shaping platform 18 in the region where the three-dimensional object 50 is being formed on the shaping platform 18 may be airflows that flow toward the three-dimensional object 50 on the shaping platform 18. Also, in the present embodiment, the inkjet heads 202 discharge ink droplets vertically downward. In this case, the airflows that flow from the inkjet heads 202 toward the shaping platform 18 are airflows that flow in the vertically downward direction, for example.

More specifically, in the present embodiment, the airflow generator 206 has a filter 302, a fan 304, an air passage 306, and multiple air outlets 308. The filter 302 is provided in the air inlet for suctioning air into the carriage 14, for example, and removes foreign objects such as microparticles in the air. The fan 304 is a structure for drawing air into the carriage 14, is provided in the air passage 306 in the carriage 14, and draws air from outside the carriage 14 to the inside of the carriage 14 via the filter 302. The drawn-in air then flows through the air passage 306 and is discharged out from the carriage 14 through the airflow air outlets 308. The air passage 306 is a passage for air in the carriage 14.

The air outlets 308 are outlets for air that is flowing through the air passage 306. The air outlets 308 are arranged at positions that are adjacent to respective inkjet heads 202 and in the surface that includes the nozzle surfaces of the inkjet heads 202, for example, and therefore airflows that flow from the inkjet heads 202 toward the shaping platform 18 are discharged from positions adjacent to the respective inkjet heads 202. Accordingly, the airflow generator 206 generates airflows that flow from the inkjet heads 202 toward the shaping platform 18.

In the present embodiment, the air outlets 308 are hole portions that extend in the sub scanning direction along the nozzle rows of adjacent inkjet heads 202, for example. According to this configuration, it is possible to appropriately discharge an airflow that flows along the ink droplets discharged from each of the nozzles in the nozzle row.

Letting L be the gap corresponding to the distance between the uppermost surface of the three-dimensional object 50 being shaped and the inkjet heads 202, in the present embodiment, it is preferable that L is set to a distance that is sufficiently small, that is to say, a distance that enables appropriate printing in the case of printing a two-dimensional image using the inkjet heads 202, for example. Here, enabling appropriate printing in the case of printing a two-dimensional image refers to the ability to appropriately perform printing with a precision corresponding to the resolution even if printing were performed without discharging airflows from the airflow generator 206, for example. According to this configuration, it is possible to appropriately raise the precision of ink droplets landing in the case of discharging ink droplets in a manner similar to when printing a two-dimensional image, for example. More specifically, it is preferable that the gap L is less than or equal to 3 mm, for example. It is further preferable that the gap L is less than or equal to 1 mm, for example.

However, when shaping the three-dimensional object 50 as in the present embodiment, if the gap L is simply reduced, there are cases where the landing position becomes shifted or the like in some regions, for example. More specifically, when shaping a three-dimensional object 50 of a certain height or more for example, there are cases where an airflow such as a tumble flow is generated in the vicinity of the edges of the three-dimensional object 50 in the main scanning direction due to the influence of movement of the inkjet heads 202 in the main scanning operation. There are also cases where this causes a shift in the landing position in the vicinity of the edges of the three-dimensional object 50.

Here, the height of the three-dimensional object 50 is the height in the case where the height direction is the direction parallel to the discharge direction in which the inkjet heads 202 discharge ink droplets, for example. In the present embodiment, the height of the three-dimensional object 50 is the height in the Z direction.

In the present embodiment, the height of the completed three-dimensional object 50 is in the range of several centimeters to several tens of centimeters. It is thought that when the height of the three-dimensional object 50 reaches 1 cm or more for example, an airflow such as a tumble flow is likely to be generated in the vicinity of the edges of the three-dimensional object 50. In particular, it is thought that the influence of the tumble flow or the like increases when the height reaches 3 cm or more.

Also, it is thought that an airflow such as a tumble flow is particularly likely to be generated when the gap L is small. For this reason, in the case where the gap L is approximately 1 to 3 mm for example, it is thought that as the height of the three-dimensional object 50 increases, a tumble flow or the like is more likely to be generated in the vicinity of the edges of the three-dimensional object 50 in the main scanning direction when the inkjet heads 202 and the three-dimensional object 50 being shaped face each other in the main scanning operation. For this reason, if ink droplets are simply discharged from the inkjet heads 202 in this case, the precision of the landing position will be improved in regions not in the vicinity of the edges by reducing the gap L, but it is thought that the precision of the landing position will decrease in the vicinity of the edges.

In contrast, in the present embodiment, the airflow generator 206 is used to suppress a reduction in the precision of the landing position even if a tumble flow or the like is generated in the vicinity of the edges of the three-dimensional object 50. This makes it possible to appropriately shape the three-dimensional object 50 with high precision. This will be described in further detail below.

Figure 2A:
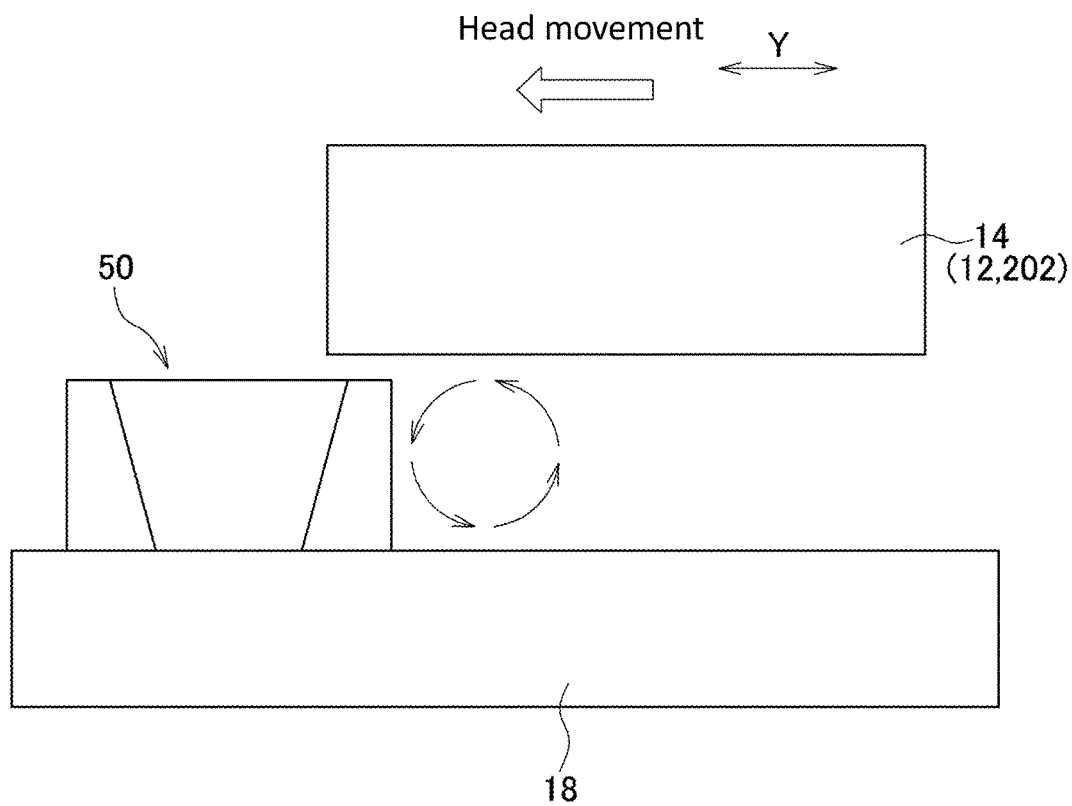
FIG. 2(a) is a diagram illustrating a tumble flow that is generated in the vicinity of the rear edge of the three-dimensional object 50 during a main scanning operation.
Figure 2B:
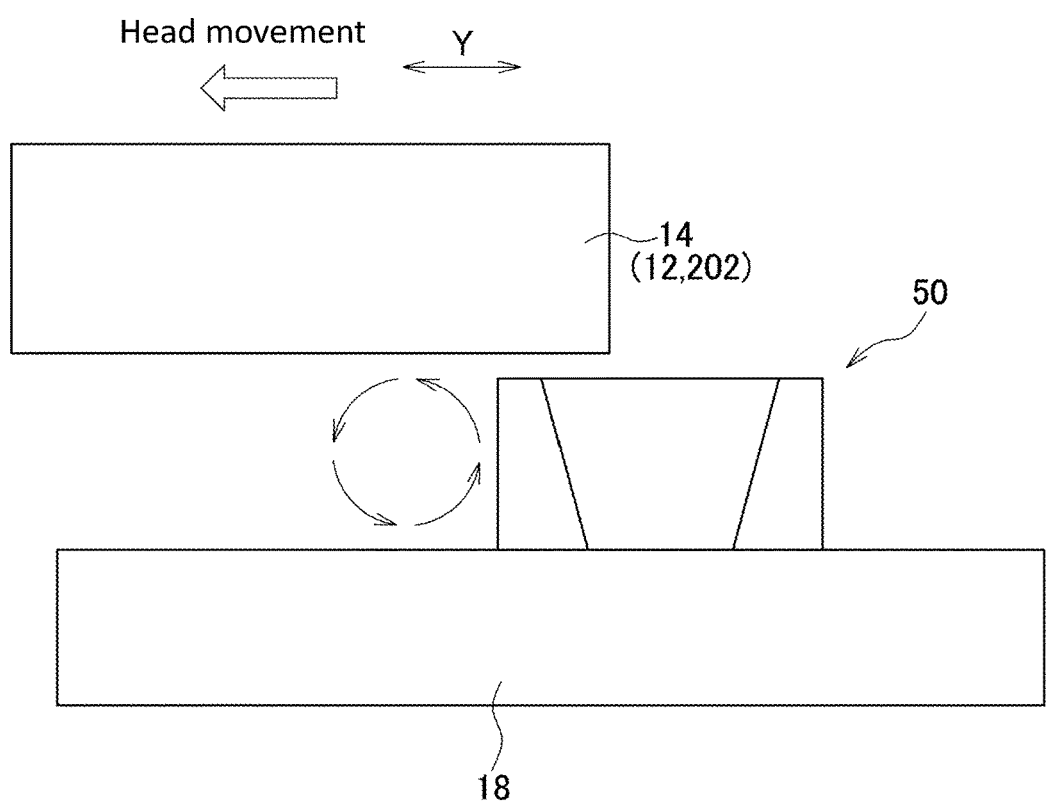
FIG. 2(b) is a diagram illustrating a tumble flow that is generated in the vicinity of the front edge of the three-dimensional object 50 during the main scanning operation.

FIGS. 2(a) and 2(b) are diagrams illustrating tumble flows that are generated in the vicinity of the edges of the three-dimensional object 50 in the main scanning operation. FIG. 2(a) is a diagram illustrating a tumble flow that is generated in the vicinity of the rear edge, which is the edge of the three-dimensional object 50 on the rear side in the direction of movement of the inkjet heads in the main scanning operation. In the present embodiment, the carriage 14 that holds the head unit 12 is moved in the main scanning direction in the main scanning operation. The carriage 14 therefore passes over the three-dimensional object 50 while moving in the main scanning direction. It is also thought that during the movement of the carriage 14, some of the air surrounding the carriage 14 moves along with the carriage 14.

For this reason, when a three-dimensional object 50 of a certain height or more is shaped with a small gap L, in the region in front of the rear edge of the three-dimensional object 50, the air that is in the vicinity of the lower surface of the carriage and is moving along with the carriage 14 will collide with the edge of the three-dimensional object 50, and a tumble flow will be generated as shown by the arrow in the figure. Here, the air colliding with the edge of the three-dimensional object 50 and a tumble flow being generated refers to a situation in which, for example, a tumble flow is generated in the vicinity of the nozzle surfaces of the inkjet heads 202 due to air being divided or sheared by the edge of the three-dimensional object 50. As a result, in the vicinity of the rear edge of the three-dimensional object 50, the surrounding air flows from the inkjet heads 202 held by the carriage 14 toward the three-dimensional object 50 as shown by the arrow in the figure.

The direction of this flow of air is approximately the same as the flight direction of ink droplets discharged by the inkjet heads of the head unit 12. For this reason, it is thought that in this case, the flight speed of the ink droplets is influenced by the flow of surrounding air, and is accelerated a certain extent. However, it is thought that this increase in the flight speed of the ink droplets usually has only a small amount of influence on the precision of the landing position. For this reason, it is thought that even if a tumble flow is generated in the vicinity of the rear edge of the three-dimensional object 50, there is only a small amount of influence on the precision of the landing position.

In contrast, the influence of a tumble flow is thought to be greatly different in the vicinity of the front edge, which is the edge of the three-dimensional object on the front side in the direction of movement of the inkjet heads in the main scanning operation. FIG. 2(b) is a diagram illustrating a tumble flow that is generated in the vicinity of the front edge of the three-dimensional object 50. As the carriage 14 moves further from the position shown in FIG. 2(a), the carriage 14 starts to move away from the three-dimensional object 50 as shown in FIG. 2(b). In this case, in the vicinity of the front edge of the three-dimensional object 50, a tumble flow such as that shown by the arrow in FIG. 2(b) is generated by air that is in the vicinity of the lower surface of the carriage and is moving along with the carriage 14, for example. As a result, conversely to the region in the vicinity of the rear edge, the surrounding air in the vicinity of the front edge of the three-dimensional object 50 flows from the three-dimensional object 50 toward the inkjet heads 202.

This flow of air is one example of a front edge airflow, which is an airflow that flows from the three-dimensional object 50 toward the inkjet heads 202 at the front edge of the three-dimensional object 50. In contrast to the case shown in FIG. 2(a), the direction of the flow of air in this case is approximately opposite to the flight direction of ink droplets. This flow of air therefore hinders the flight of ink droplets. For this reason, if ink droplets are simply discharged in this case, the flight speed of the ink droplets will decrease, and the flight direction will change. As a result, shifting of the landing position is thought to occur to a greater extent. Also, if the flight speed is reduced excessively, there are cases where ink droplets float in the air and form a mist instead of landing.

In contrast, in the present embodiment, the influence of this flow of air can be reduced by the generation of airflows by the airflow generator 206 (see FIGS. 1(a) and 1(b)). More specifically, in this case, the airflow generator 206 generates airflows that flow from the inkjet heads 202 toward the shaping platform 18 against the tumble flow on the front edge side. Here, airflows that flow from the inkjet heads 202 toward the shaping platform 18 against the tumble flow are airflows that overcome the influence of the tumble flow and cause ink droplets to land on the three-dimensional object 50, for example. Also, overcoming the influence of the tumble flow and causing ink droplets to land on the three-dimensional object 50 refers to causing ink droplets to land with a precision in an allowable range that corresponds to the shaping resolution, for example.

According to the present embodiment, the influence of a tumble flow generated on the front edge side of the three-dimensional object 50 can be appropriately suppressed by generating airflows using the airflow generator 206, for example. Accordingly, it is possible to cause ink droplets to more appropriately land on the three-dimensional object 50 being shaped, for example.

As described above, in the present embodiment, airflows are generated using the airflow generator 206 in order to solve a unique problem that occurs when shaping the three-dimensional object 50. For this reason, with the exception of using the airflow generator 206, ink droplets may be discharged from the inkjet heads 202 under conditions that are the same as or similar to those in two-dimensional image printing technology, for example. Also, the airflow air outlets 308 may be limited to the heads that discharge ink droplets at the edges of the three-dimensional object 50. For example, in the case of shaping in which the support portion 54 is at the edges, the outlets may be limited to the inkjet heads 202 that discharge supporting ink. Also, in the case of shaping in which the model portion 52 is at the edges, the outlets may be limited to the heads that discharge shaping ink. Alternatively, in the case of shaping a three-dimensional object 50 that is to have a colored surface, the outlets may be limited to the heads that discharge coloring ink in the edge portions. Furthermore, these configurations may be combined with each other. Also, the flow of airflows may be selectively switched using electromagnetic valves or the like in accordance with the edges of the three-dimensional object 50.

More specifically, in the present embodiment, the airflow generator 206 generates airflows even when ink droplets are discharged from the inkjet heads 202 at positions other than the edges of the three-dimensional object 50. However, various conditions regarding the discharge of ink droplets by the inkjet heads (e.g., the gap L and the ink droplets volume) may be set without giving consideration to the influence of a tumble flow or the like generated in the vicinity of the edges of the three-dimensional object 50.

For example, a configuration is possible in which in the case where the influence of a tumble flow or the like generated in the vicinity of the edges of the three-dimensional object 50 is ignored, the inkjet heads 202 discharge ink droplets under conditions that allow ink droplets to appropriately land even without using the airflow generator 206. More specifically, when discharging ink droplets toward a flat region that can be considered to be the same as or similar to a region in two-dimensional image printing technology, ink droplets may be discharged under conditions according to which landing position shifting, mist formation, and the like do not occur even without using the airflow generator 206. Also, regarding various conditions such as the gap L, the ink droplets volume, the ink discharge force, and the like, ink droplets discharged by the inkjet head 202 toward a flat region may be discharged under conditions according to which the ink droplets land with a precision in an allowable range corresponding to the resolution even without causing airflows to be generated by the airflow generator 206.

In this case, being able to cause ink droplets to land appropriately refers to the speed of ink droplets traveling toward the target landing position being greater than zero immediately before landing, for example. Also, in the case where the inkjet heads 202 discharge ink droplets vertically downward as in the present embodiment, the speed of ink droplets traveling toward the target landing position being greater than zero may mean that the vertically downward speed component of the speed of the ink droplets is greater than zero immediately before landing.

More specifically, as previously described, in the present embodiment it is preferable that the gap L is less than or equal to 3 mm, for example. It is further preferable that the gap L is less than or equal to 1 mm, for example. According to this configuration, it is possible to cause ink droplets to land more appropriately and with high precision, for example. Also, the inkjet heads 202 discharge ink droplets with a volume of at least 1 pL, for example. It is preferable that the volume of the ink droplets is at least 3 pL, for example. If the volume of the ink droplets is sufficiently high, it is usually possible to cause the ink droplets to land with higher precision. For this reason, in this case, if the influence of a tumble flow generated in the vicinity of the edges of the three-dimensional object 50 is ignored, ink droplets can be caused to land appropriately and with high precision even without using the airflow generator 206.

As previously described, it is actually necessary to give consideration to the influence of a tumble flow or the like in the vicinity of the edges of the three-dimensional object 50 during shaping. To address this, according to the present embodiment, the airflow generator 206 is used to cause ink droplets to land more appropriately even in the vicinity of the edges of the three-dimensional object 50. This makes it possible to more appropriately shape the three-dimensional object 50 with high precision, for example.

Next, a modified example of the airflow generator 206 provided in the carriage 14 will be described. The specific configuration of the airflow generator 206 is not limited to the description given above, and may be modified in various ways. For example, instead of using the fan 304 (see FIG. 1(*b*)) in the carriage 14 to generate the flow of air from the air outlets 308 (see FIG. 1(*b*)), a flow of air generated by a driver outside the carriage 14 may be suctioned into the carriage 14. In this case, it is conceivable to feed air from the main scanning driver 20 (see FIGS. 1(*a*) and 1(*b*)) toward the carriage 14 via the guide rail 16 (see FIG. 1(*a*)), for example.

Figure 3:
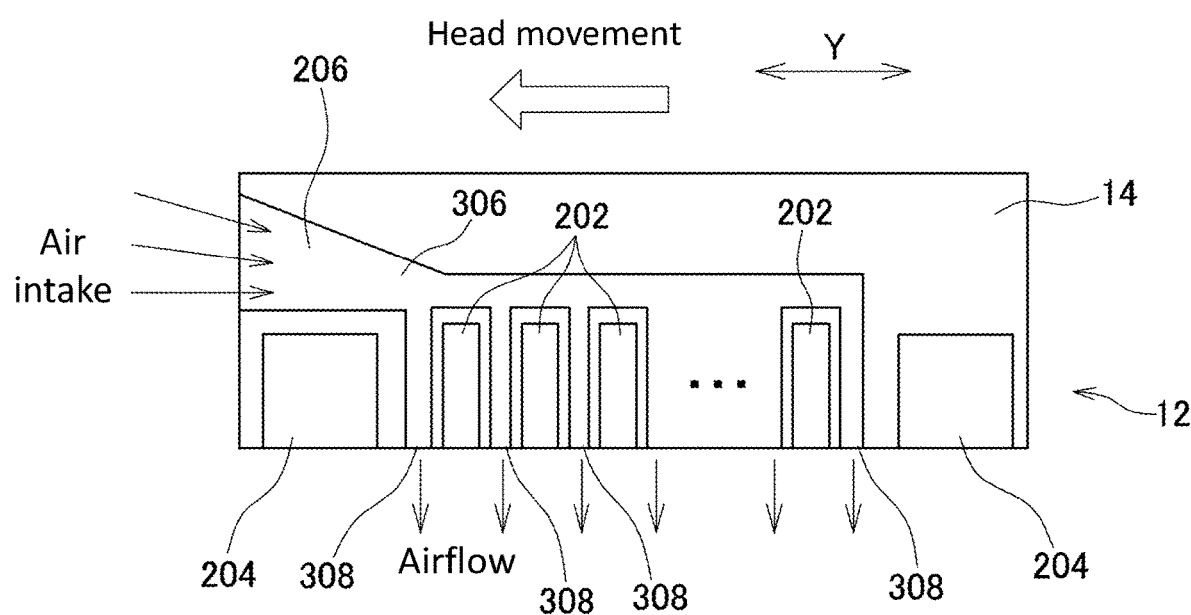
FIG. 3 is a diagram showing a modified example of the configuration of an airflow generator 206.

Also, an airflow may be generated in the airflow generator 206 without using the fan 304. FIG. 3 is a diagram showing a modified example of the configuration of the airflow generator 206, and also showing the head unit 12 and the carriage 14 that has the airflow generator 206. With the exception of the matter described below, configurations in FIG. 3 that have the same reference signs as in FIGS. 1(*a*) to 2(*b*) may have features that are the same as or similar to those in FIGS. 1(*a*) to 2(*b*).

In this modified example, the airflow generator 206 has an opening portion that is on the front side in the main scanning operation, and air is drawn into the air passage 306 of the airflow generator 206 via the opening portion due to movement of the carriage 14. Airflows are generated by blowing the suctioned air out from the air outlets 308. With this configuration as well, the airflow generator 206 can be caused to generate airflows more appropriately.

The present disclosure can be favorably used in a three-dimensional object shaping apparatus, for example.

What is claimed is:

1. A three-dimensional object shaping system that is a shaping apparatus for shaping a three-dimensional object, comprising:
   a controller that controls an operation for shaping the three-dimensional object by controlling each unit of the shaping apparatus based on a geometric information and a color image information of the three-dimensional object that is to be shaped;
   a plurality of inkjet heads, configured to discharge ink droplets using an inkjet method;

a shaping platform that is a platform-shaped member configured to support the three-dimensional object being shaped at a position facing the inkjet heads;

a carriage that holds the plurality of inkjet heads facing the shaping platform;

a main scanning driver, configured to cause the inkjet heads to perform a main scanning operation in which ink droplets are discharged while moving relative to the shaping platform in a pre-set main scanning direction; and a laminate direction driver, configured to move the inkjet heads or the shaping platform in a laminate direction orthogonal to the main scanning direction and a nozzle surface of each of the inkjet heads;

wherein the three-dimensional object is shaped by stacking a plurality of ink layers formed by discharging the ink droplets onto the shaping platform, the carriage comprises an air flow generator which generates an airflow that flows from the plurality of inkjet heads toward the shaping platform;

wherein the air flow generator comprises:
an air passage, disposed in the carriage; and
a plurality of air outlets, disposed in the carriage, wherein the plurality of inkjet heads is arranged in the air passage so as to be side-by-side in the main scanning direction with the plurality of air outlets disposed therebetween.

2. The three-dimensional object shaping system according to claim 1, wherein
a height from the shaping platform to an uppermost surface of the three-dimensional object is 1 cm or more.

3. The three-dimensional object shaping system according to claim 1, wherein
the plurality of inkjet heads is separated from each other by a predetermined distance.

4. The three-dimensional object shaping system according to claim 2, wherein
the plurality of inkjet heads is separated from each other by a predetermined distance.

5. The three-dimensional object shaping system according to claim 1, wherein
the plurality of inkjet heads is configured to generate an airflow from the plurality of air outlets toward the shaping platform, and
in the carriage, the plurality of air outlets is respectively provided on a front side in the main scanning direction of the plurality of inkjet heads.

6. The three-dimensional object shaping system according to claim 2, wherein
the plurality of inkjet heads is configured to generate an airflow from the plurality of air outlets toward the shaping platform, and
in the carriage, the plurality of air outlets is respectively provided on a front side in the main scanning direction of the plurality of inkjet heads.

7. The three-dimensional object shaping system according to claim 3, wherein
the plurality of inkjet heads is configured to generate an airflow from the plurality of air outlets toward the shaping platform, and
in the carriage, the plurality of air outlets is respectively provided on a front side in the main scanning direction of the plurality of inkjet heads.

8. The three-dimensional object shaping system according to claim 1, wherein
a distance between an uppermost surface of the three-dimensional object during shaping and the inkjet heads is shorter than a distance between the inkjet heads and the shaping platform.

9. The three-dimensional object shaping system according to claim 2, wherein
a distance between an uppermost surface of the three-dimensional object during shaping and the inkjet heads is shorter than a distance between the inkjet heads and the shaping platform.

10. The three-dimensional object shaping system according to claim 3, wherein
a distance between an uppermost surface of the three-dimensional object during shaping and the inkjet heads is shorter than a distance between the inkjet heads and the shaping platform.

11. The three-dimensional object shaping system according to claim 5, wherein
a distance between an uppermost surface of the three-dimensional object during shaping and the inkjet heads is shorter than a distance between the inkjet heads and the shaping platform.

12. The three-dimensional object shaping system according to claim 1, wherein
the inkjet heads are configured to discharge a model material for forming a main portion of the three-dimensional object and a support material for forming a support portion that supports the main portion by surrounding the main portion of the three-dimensional object, so as to form the ink layers; and
the support portion is removed after shaping of the three-dimensional object is completed.

13. The three-dimensional object shaping system according to claim 2, wherein
the inkjet heads are configured to discharge a model material for forming a main portion of the three-dimensional object and a support material for forming a support portion that supports the main portion by surrounding the main portion of the three-dimensional object, so as to form the ink layers; and
the support portion is removed after shaping of the three-dimensional object is completed.

14. The three-dimensional object shaping system according to claim 3, wherein
the inkjet heads are configured to discharge a model material for forming a main portion of the three-dimensional object and a support material for forming a support portion that supports the main portion by surrounding the main portion of the three-dimensional object, so as to form the ink layers; and
the support portion is removed after shaping of the three-dimensional object is completed.

15. The three-dimensional object shaping system according to claim 5, wherein
the inkjet heads are configured to discharge a model material for forming a main portion of the three-dimensional object and a support material for forming a support portion that supports the main portion by surrounding the main portion of the three-dimensional object, so as to form the ink layers; and
the support portion is removed after shaping of the three-dimensional object is completed.

16. The three-dimensional object shaping system according to claim 1, wherein the air flow generator is configured to selectively switch a flow of the airflow in accordance with an edge of the three-dimensional object.

\* \* \* \* \*